Sept. 27, 1932.   G. OVERTON   1,879,763
VALVE
Filed Jan. 31, 1931
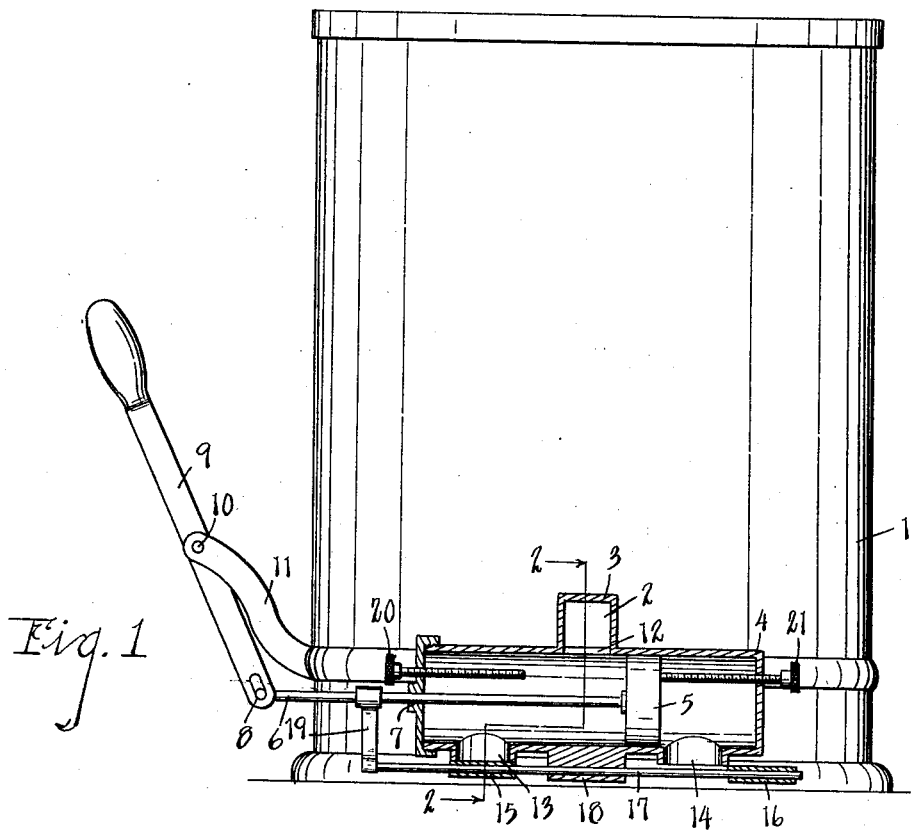
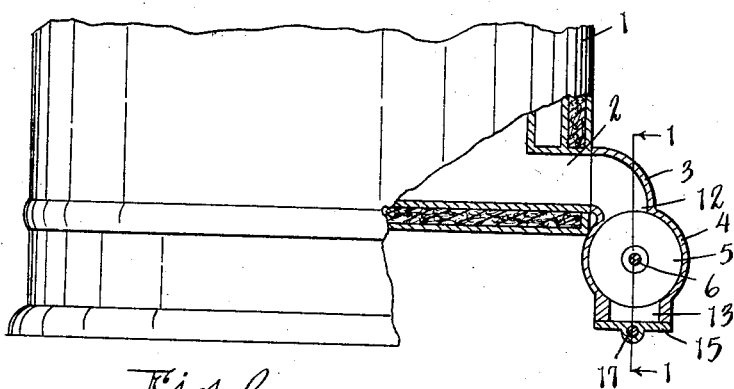
INVENTOR
Glen Overton
BY Chappell & Carl
ATTORNEYS Patented Sept. 27, 1932

1,879,763

UNITED STATES PATENT OFFICE

GLEN OVERTON, OF ALLEGAN TOWNSHIP, ALLEGAN COUNTY, MICHIGAN

VALVE

Application filed January 31, 1931. Serial No. 512,517.

The objects of this invention are:

First, to provide a valve for easily and efficiently withdrawing ice cream from fountain ice cream freezers. The present practice, which is growing in popularity, is for the owners of soda fountains to make their own ice cream. This is done on the counter before the patron's eyes in a so-called fountain ice cream freezer. When the ice cream is frozen it is withdrawn from the freezer through an opening in the freezer. To force the ice cream from the freezer, the dasher is kept running and the tendency is to over-whip the ice cream if too long a time is taken in the drawing operation. This invention speeds the operation and at the same time provides a valve that is of interest to customers who watch the operation.

Second, to provide such a valve that will discharge a definite, predetermined amount of ice cream at each operation.

Objects pertaining to details and economies of construction and operation will appear from the description to follow. A preferred embodiment of my invention is illustrated in the accompanying drawing, in which:

Fig. 1 is a view partly in section showing my valve.

Fig. 2 is a partial section on line 2—2 of Fig. 1.

The parts will be identified by their numerals of reference which are the same in all the views.

1 is the body of a fountain ice cream freezer. 2 is the outlet from the ice cream container having a discharge spout 3 opening into the central portion of cylinder 4 through opening 12. 5 is a piston in said cylinder having a piston rod 6 passing through opening 7. A lever 9 is pivotally attached to rod 6 at 8. Lever 9 is pivoted at 10 to fulcrum 11.

At the lower side of the cylinder 4 are openings 13 and 14 positioned near the end of the cylinder. Associated with these openings are slidable covers 15 and 16 mounted on a rod 17 which is slidably mounted as at 18 and connected to piston rod 6 by arm 19. These slidable covers are so arranged that when the piston 5 moves toward an opening the slidable cover associated with that opening is opened and the slidable cover associated with the other opening is closed. In the cylinder 4 are adjustable stops 20 and 21 to limit the stroke of the piston 5.

In operation the dasher of the freezer, which is not shown here because it is conventional, is revolved in the freezer to force the ice cream through opening 2 into the cylinder 4. With the piston in the position shown in Fig. 1, the opening 13 is closed by the slidable cover 15 and the left hand portion of the cylinder (see Fig. 1) is filled with ice cream. When it is filled, a movement of the lever 9 pulls the plunger 5 against stop 20. This slides the cover 15 from the opening 13 and a predetermined amount of ice cream is fed into any suitable container which can be placed below the opening 13.

With the plunger 5 against stop 20, the cover 16 covers opening 14 and the right hand portion of the cylinder (see Fig. 1) is filled with ice cream. A movement of the lever 9 then forces the plunger 5 to the position shown in Fig. 1, sliding cover 16 to open opening 14. By proper adjustments of the stops a predetermined quantity of ice cream can be fed at each stroke of the piston. A partial vacuum is created behind the plunger on each stroke which tends to hasten the discharge of the ice cream.

The use of this invention enables an operator to quickly empty the freezer to prevent over-whipping, which would be caused if the dasher in the freezer were allowed to work on the cream too long after it is frozen.

Having thus described my invention, what I claim as new and desire to secure by Letters Patent is:

A valve for fountain ice cream freezers comprising a hollow cylinder, a piston fitting in the bore of said cylinder, a piston rod for actuating said piston, an inlet for said cylinder in the portion of said cylinder traversed by said piston and adapted to be connected with the outlet of a freezer, outlets in said cylinder in the portion of said cylinder not traversed by said piston, slidable valves for closing said outlets, means for opening each valve as the stroke of the piston is toward it, and means for closing said valve on the return stroke.

In witness whereof I have hereunto set my hand.

GLEN OVERTON.